United States Patent [19]

Sibley

[11] 3,863,752
[45] Feb. 4, 1975

[54] SUPPORT UNIT FOR A MOBILE BELT CONVEYOR
[76] Inventor: John R. Sibley, 401 Circle St., Franklin, Pa. 16323
[22] Filed: Feb. 5, 1973
[21] Appl. No.: 329,629

[52] U.S. Cl............ 198/109, 198/192 R, 198/202
[51] Int. Cl............................................. B65g 41/00
[58] Field of Search..................... 198/109, 202, 192

[56] References Cited
UNITED STATES PATENTS
2,815,851  12/1957  Yoshimura........................ 198/192
3,701,411  10/1972  McGinnis........................... 198/109

Primary Examiner—Richard A. Schacher
Assistant Examiner—Jeffrey V. Nase

[57] ABSTRACT

A support unit, for a mobile belt conveyor, having multiple belt supporting idlers with some of the idlers mounted on swing brackets controlled by the relative angular positioning of successive support units to provide idler end locations to produce curved belt edges and controlled horizontal belt curvature as a result of moving the conveyor along a curved path.

13 Claims, 4 Drawing Figures

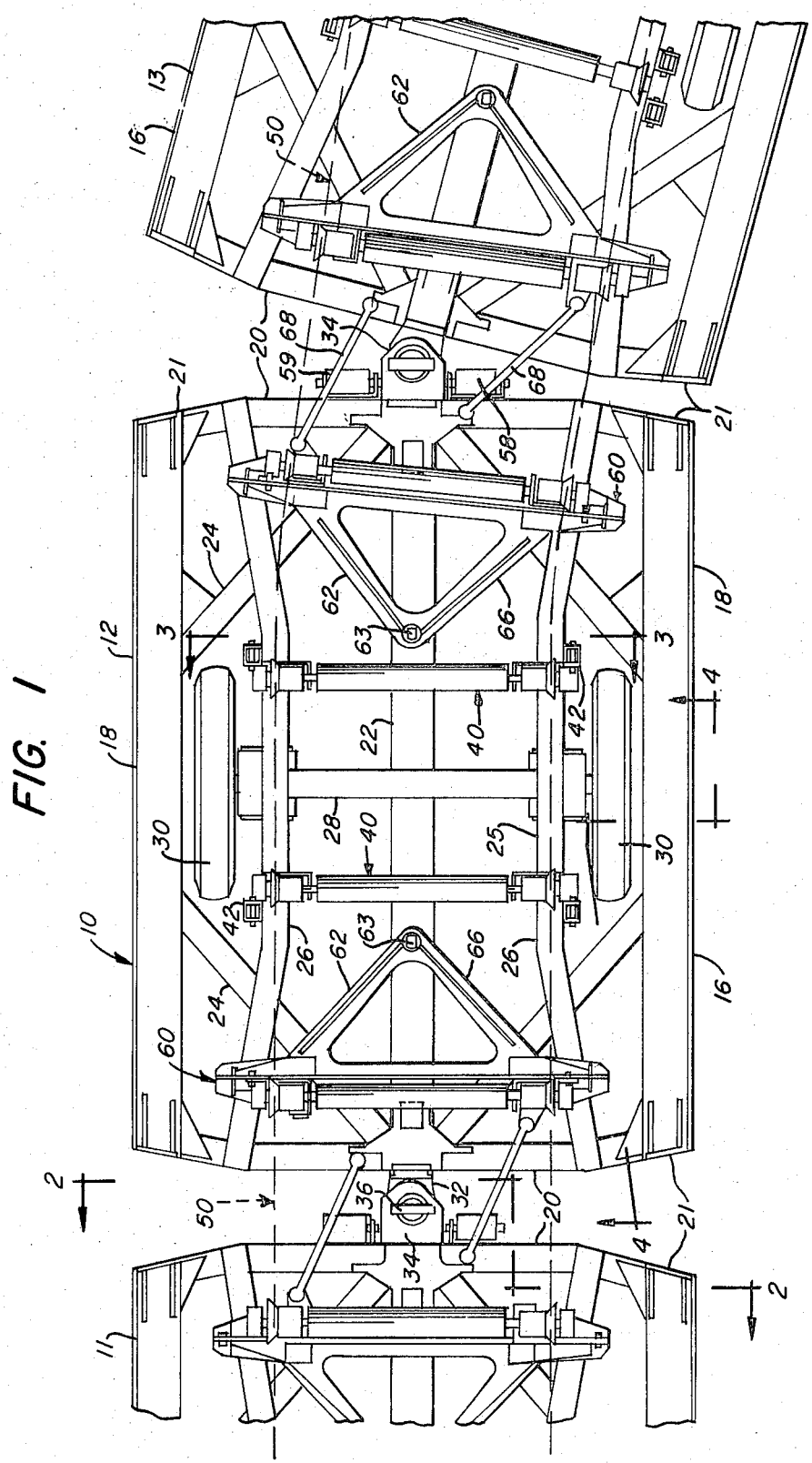

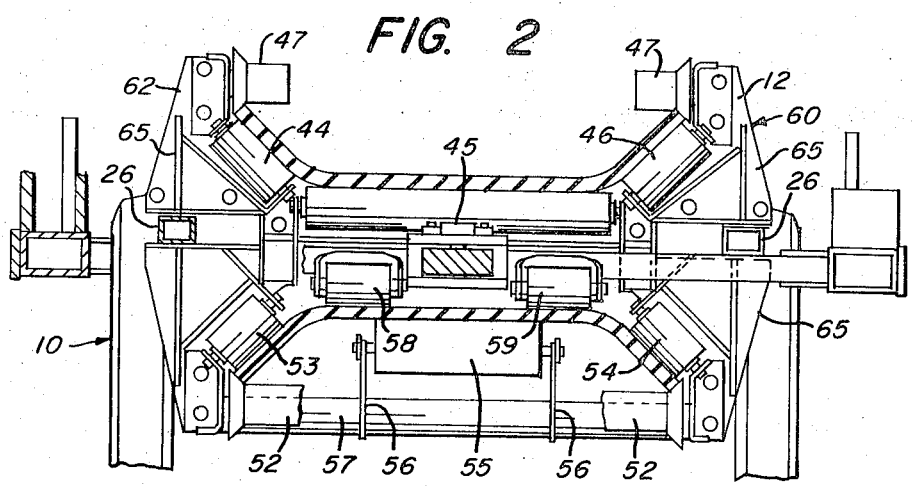
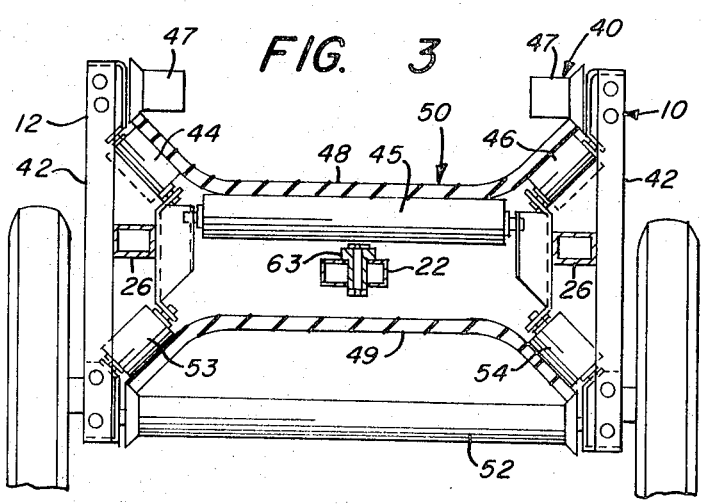
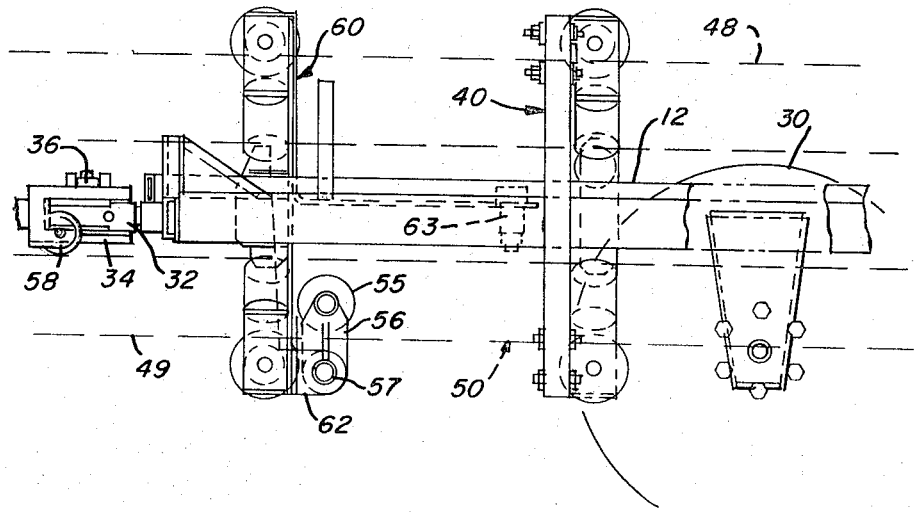

3,863,752

SUPPORT UNIT FOR A MOBILE BELT CONVEYOR

Flexible mobile conveyors for carrying bulk material along a transversely curved path and movable along such a path without interruption of the conveying action are known in the field of bulk material transporting. Such a mobile conveyor is seen the mobile conveyor system shown and described in U.S. Pat. No. 3,701,411 (McGinnis, Oct. 21, 1972) wherein it is to be seen that the mobile conveyor is made up of separate pivotally connected units for supporting a horizontally flexible belt. Each such unit commonly supports a number of belt training and supporting rollers or belt idlers which work very satisfactorily when the successive units are aligned with each other. However, in prior art devices the only provision made for supporting the belt during angular positioning of successive units has been the provision of longer idlers at the ends of the units than those in the central portion so that when the belt curved it was partially controlled along its inner edge but the radially outer edge of the curved belt was relatively free to assume unwanted curvature resulting in unacceptable belt action which interfered with the efficiency of the conveying operation. Such idler sets longer than the belt width, are known as open idlers as distinguished from idler sets contacting and controlling both edges of the belt which are known as closed idler sets.

It is an object of this invention to provide a belt supporting unit in which the positioning of the idlers at each end of the belt supporting unit is incrementally variable and is regulated by the relative angular positioning of successive units to produce the desired control of inner and outer edge curvature of a horizontally curved belt as it proceeds around curves in the desired path.

This and other objects and advantages of this invention will be more readily apparent upon consideration of the following description and drawings in which:

FIG. 1 is a top plan view of a conveyor supporting unit constructed according to the principles of this invention and includes fragmentary portions of preceding and following units of the same design connected to the fully shown unit;

FIG. 2 is a sectional view taken substantially on line 2—2 of FIG. 1 looking in the direction indicated by the arrows;

FIG. 3 is a sectional view taken substantially on line 3—3 of FIG. 1 looking in the direction indicated by the arrows;

FIG. 4 is a side elevational partially sectional view taken on line 4—4 of FIg. 1 looking in the direction indicated by the arrows.

In FIG. 1 there is shown in plan view a portion of a mobile conveyor generally indicated at 10 represented by a fully illustrated central unit 12 as seen in FIG. 1 pivotally connected to identical units fragmentarily shown as unit 11 for the left hand unit and unit 13 for the right hand unit as seen in FIG. 1. All of the regular support units of the conveyor 10 being identical the unit 12 and the fragments 11 and 13 will suffice to show the typical unit and its relationship to other units of the conveyor wherein there may be a train comprising forty or more such units reaching from a receiving point at the delivery end of a continuous miner to a delivery point at the receiving end of a permanently installed panel conveyor belt or the like. End supporting and drive units may be the same as or similar to those shown in the above cited U.S. patent and are connected to the ends of the support unit train to provide belt drive power and traction effort to move the conveyor as necessary to follow the mining machine in its work progress.

Since all of the regular support units are identical only unit 12 will be described together with its relationship to unit 11 aligned with unit 12 and its relationship to unit 13 having an angular relationship to unit 12 such as would be developed in the units of the conveyor 10 when negotiating a curve in order to follow the advance of the continuous miner.

As seen in FIG. 1 conveyor unit 12, typical of all conveyor units of the mobile conveyor 10, comprises a generally rectangular frame 16 elongated in the direction of conveyor travel to the left or right as seen in FIG. 1 having elongated side pieces 18 and end pieces such as cross members 20 normal to the longitudinal center line of the frame 16 but having slanted end portions 21 angled away from the next adjacent unit in each case. Each frame 16 also comprises a longitudinally extending mid-member 22 rigidly secured along the longitudinal center line of the frame 16 as well as corner bracing diagonal members 24. The side pieces 18, cross members 20, mid-member 22 and diagonal members 24 are all rigidly secured together as by welding to form a substantially flat frame having the top surfaces all in a common plane.

Extending over the upper surface of the diagonal members 24, the cross members 20, and the mid-member 22 is a generally H-shaped support frame 25 comprising a pair of longitudinally extending rail members 26 each extending from one slanted end portion 21 to the other slanted end portion 21 on the same side of the unit. The two rail members 26 are spaced from each other transversely of the unit 12, rigidly secured to the members over which they extend and secured in spaced relationship to each other by a cross bar member 28 extending transversely of the unit 12 along the transverse center line thereof to complete the support frame 25.

Rotatably secured to the support frame 25 is a pair of ground engaging mobile support means such as wheels 30 for carrying the unit 12 over a surface such as the ground or the floor of a mine. Extending from the left hand end of the midmember 22 as seen in FIG. 1 is a tongue member 32 and from the right hand end thereof a jaw member 34 for engaging the respective tongue and jaw members 32 and 34 of the adjacent units 11 and 13 by means of a pivotally related pin 36 to provide traction and steering for the unit 12 in a well known manner for an articulated mobile conveyor.

Two sets of belt supporting rollers or idlers generally indicated at 40 are rotatably supported in fixed positions to the left and right of cross bar member 28 and supported by a pair of vertically extending bracket members 42 rigidly secured to respective rail members 26 to rotatably support the rollers of the set 40 in the described fixed position. These rollers of each fixed set 40 are best seen in FIG. 3 to comprise a closed subset of three belt supporting troughing rollers 44, 45, and 46, respectively, and two hold down edge rollers 47, all above the frame 16 for respectively supporting the body of, and contacting and holding down the edges of a load carrying run 48 of a conveying belt 50. Such a belt 50 is of the type having a flexible but substantially inextensible central spine or core and having corrugated or otherwise extensible edges to provide lateral flexibility for a belt such as that set forth in U.S. Pat. No. 3,545,598 and applied in the above cited U.S. patent.

The brackets 42 also support a closed subset of rotatably mounted rollers 52, 53 and 54 positioned below the frame 16 to control the return run 49 of the belt 50 through the central portion of the unit 12 as best seen in FIG. 3. It is to be realized that the long horizontal roller 52 although contacting only the edges of the return run 49 is the supporting roller for this part of the return run while the obliquely positioned rollers 53 and 54 are hold down rollers for the return run 49 at this point in the unit 12. It is further to be seen that the horizontal roller 45 of the upper rollers provides support for the load carrying run 48 along with the obliquely positioned rollers 44 and 46 which support the sides of the troughing belt 50. Only the stub rollers 47 at the top of the FIG. 3 provide hold down and edge control for the load carrying run 48 at this point in the travel of the belt through unit 12.

Inwardly adjacent each end of each unit, as for instance unit 12, a pivotable roller set generally indicated at 60 (see FIG. 2) is mounted on a swing bracket 62 pivotally secured to the rib member 20 at a point inwardly spaced on the unit 12 from the plane of the roller set 60 to provide swinging action of the roller set 60 when the units 11, 12 and 13 change positions relative to each other by angular relative motion thereof. A pivot pin 63 is removably secured and extending through the pivot point of the bracket 62 and the mid-member 22 to provide pivoting for the bracket 62 as hereinafter described.

Each bracket 62 includes a pair of jaw members 65 slidably receiving the rail members 26 between jaw portions thereof and rigidly connected together by a generally triangular bracket body member 66 extending from the pivot pin 63 to both jaw members 65. The jaw members 65 are of course provided with suitable mounting brackets for the rollers 44 through 47 and 52 to 54 as best seen in FIG. 2. Each pivotable roller set 60 also contains a horizontally disposed return run support roller 55 rigidly mounted as by brackets 56 extending from a hollow support member such as a pipe 57 mounted at and extending between the lower end portions of the jaw members 65 and swingable therewith.

Each swing bracket 62 is connected at a point on one jaw member 65 to a point on the cross member 20 of the nearer end of the adjacent unit by a link 68 pivotally mounted at the respective ends thereof so that for instance angular motion of the unit 13 with respect to the unit 12 will swing the respective bracket 62 with its respective pivotable roller set 60 in the direction and to the proper amount to keep the end locations of the respective roller set 60 positioned to control the edges of the belt 50 in conformity with a laterally curved path to provide for progress of the conveyor 10 about a curve. The angular motion of the brackets 66 is such that, at maximum angular deviation from a straight line, the projected center lines of the adjacent end rollers and the transverse centerlines of the respective units all intersect in a common point which is the center of curvature for that portion of the belt. This means that, for any increment of the maximum angular deviation and resultant belt curvature, the rotation of the rollers of the pivotable sets 60 will be normal to the path of the belt.

As seen in FIGS. 1 and 2 two small hold down rollers 58 and 59, mounted at the right end of each unit (such as units 11 and 12) are shown in FIG. 1 in contact with the upper surface of the return run 49 to control possible upward deflection of the belt 50 between the units 11 and 12, for example.

The operation of the mobile conveyor 10 is similar to that of any troughing belt conveyor, with power for circulating the belt being supplied at the delivery end of the belt by conventional belt drive means and tension and reversing of belt motion being supplied at the loading end of the conveyor in a well known manner. The mobile conveyor 10 is movable longitudinally and it is not until a curve is being negotiated by the mobile conveyor that the particular operational capabilities provided by the present invention become evident. With the contiguous units aligned as units 11 and 12 are shown in FIG. 1 the links 68 acting on the brackets 62 keep the roller sets 60 pivotally in positions completely aligned with the fixed roller sets 40 to provide belt travel through the units 11 and 12 and any other units so aligned. When, however, the conveyor 10 is negotiating a curve, two or more of the units will be at an angle to each other as shown by units 12 and 13 in FIG. 1 at which time the links 68 connected to the brackets 62 on the adjacent ends of units 12 and 13 will, as shown in FIG. 1, angularly reposition the brackets 62 by exactly the right increments to control the curvature of the edges of the belt 50 and produce a curvature in the belt 50 necessary for negotiating the curve as determined by the relative angular positioning of units 12 and 13.

The advantages arising from employment of the structure of this invention reside in the incrementally controlled pivoting of the brackets 62 in response to the relative angular position of adjacent units such as 12 and 13 to control the curvature of the belt and force the belt to conform to the path being followed by the conveyor 10. Earlier attempts at providing such support have used open roller sets and depended on the belt to properly conform to the curvature of the path simply by bending the spine of the belt. Under some circumstances this has been successful but in general it has been found necessary to control both edges of the belt by controlled edge contact as provided by the structure of applicant's invention so that there is the necessary conformity between the curvature of the belt and the curvature of the conveyor train without depending on the normal bending characteristics of the belt to produce such a curvature.

Employment of the pivotable set 60 of rollers at each end of the unit allows the use of two fixed sets 40 of rollers near the central portion of the unit without imposing any straightening effect on the belt as it continues through a curved path. The adjacent sets of rollers being almost equally spaced from each other as fixed sets 40 on a given unit; a fixed set 40 and a pivotable set 60 on a given unit; or pivotable sets 60 on the adjacent ends of successive units, contributes to the control and conformity of the curvature of the belt to the curvature of the mobile conveyor 10 at every point in its path.

What is claimed is:

1. A conveyor train comprising: a series of support sections having portions cooperable to support a horizontally flexible conveyor belt to permit conveying of material along a generally horizontal elongated path; said support sections pivotally connected and relatively movable to vary the configuration of said path; adjacent portions of at least certain ones of said support sections having belt supporting means carried thereby and means mounting said belt supporting means for movement transversely and horizontally of said path; and connecting means connecting said adjacent sections and said belt supporting means to move said belt supporting means in said transverse and horizontal manner upon said relative movement of said certain ones of said support sections.

2. A conveyor train as specified in claim 1 wherein each of said belt supporting means includes roller sets mounted thereon.

3. A conveyor train as specified in claim 2 wherein a horizontally flexible conveyor belt is supported by said roller sets and said roller sets includes means to control both edges of said belt at all angles of deviation of said support sections relative to each other.

4. A conveyor train as specified in claim 1 wherein said support sections include a plurality of ground engaging mobile means.

5. A conveyor train as specified in claim 2 wherein said roller sets are supported above said support sections and additionally including other roller sets, with each of said other roller sets being supported below the upper surface of said support sections.

6. A conveyor train as specified in claim 1 wherein each of said certain ones of said sections rigidly and nonmovably support other belt supporting means.

7. A conveyor train as specified in claim 1 wherein said connecting means include non-extensible rigid link means extending between said belt supporting means and said adjacent portions.

8. A conveyor train as specified in claim 3 additionally including limiting means which limit the relative movement of adjacent pairs of said support sections to each other to a preselected maximum number of degrees of deviation from straight alignment.

9. A conveyor train as specified in claim 3 wherein said pivotally supported roller sets on said adjacent portions are horizontally pivoted by said pivot means at all degrees of curvature of said path to maintain uniform curvature of a conveyor belt supported by said support sections.

10. A conveyor train as specified in claim 3 wherein the pivot axis of said supporting means are substantially normal to said path.

11. A conveyor train as specified in claim 3 wherein when one of said support sections is displaced from the support section adjacent thereto in one horizontal direction the supporting means carried by said one of said support sections at said adjacent portion thereof is pivoted in the opposite horizontal direction.

12. A conveyor train as specified in claim 5 wherein said roller support and guide the top run of a conveyor belt and said other roller sets guide the bottom run of a conveyor belt.

13. A conveyor train adapted to support the upper run of a conveyor belt thereon comprising: support sections having means rendering said support sections relatively movable along a selectively variable curvalinear axis; end portions of at least certain of said support sections having horizontally movable belt supporting means carried thereon; and connecting means connecting said supporting means on one of said sections and the end section of said support section adjacent thereto to horizontally move said supporting means upon horizontal movement of said latter mentioned sections relative to each other.

* * * * *